(12) United States Patent
Wu (10) Patent No.: US 12,209,726 B2
(45) Date of Patent: Jan. 28, 2025

(54) LIGHT DEVICE FOR A VEHICLE

(71) Applicant: COPLUS INC., Tainan (TW)

(72) Inventor: Po-Hua Wu, Tainan (TW)

(73) Assignee: COPLUS Inc., Tainan (TW)

( * ) Notice: Subject to any disclaimer, the term of this patent is extended or adjusted under 35 U.S.C. 154(b) by 0 days.

(21) Appl. No.: 18/507,644

(22) Filed: Nov. 13, 2023

(65) Prior Publication Data

US 2024/0418332 A1 Dec. 19, 2024

(30) Foreign Application Priority Data

Jun. 15, 2023 (TW) .................. 112122444

(51) Int. Cl.
*F21S 41/25* (2018.01)
*F21S 45/47* (2018.01)

(52) U.S. Cl.
CPC ............... *F21S 41/25* (2018.01); *F21S 45/47* (2018.01)

(58) Field of Classification Search
CPC .......... F21S 41/25; F21S 41/265; F21S 41/24; F21S 41/27; F21S 41/26; F21S 45/47; F21S 41/151; F21S 43/47; F21Y 2105/10; F21Y 2105/12; F21Y 2105/14; F21Y 2105/16; F21Y 2105/18; F21W 2102/13; F21W 2102/135; F21W 2102/165; F21W 2103/60; G02B 6/0005; G02B 6/0008; G02B 6/0075; G02B 6/0078
See application file for complete search history.

(56) References Cited

U.S. PATENT DOCUMENTS

| 10,060,592 | B2 * | 8/2018 | Yan | F21S 41/322 |
| 10,480,743 | B2 * | 11/2019 | Gao | F21S 43/239 |
| 10,876,696 | B2 * | 12/2020 | Plank | F21S 41/141 |
| 2020/0300437 | A1 * | 9/2020 | Nagaike | G02B 6/0075 |

FOREIGN PATENT DOCUMENTS

| DE | 202013101509 U1 * | 6/2013 | .......... F21S 48/1154 |
| DE | 102018206709 A1 * | 11/2019 | |
| DE | 202022104422 U1 * | 9/2022 | ............ F21S 41/143 |
| WO | WO-2017185118 A1 * | 11/2017 | ............ F21S 41/143 |

* cited by examiner

*Primary Examiner* — Erin Kryukova
(74) *Attorney, Agent, or Firm* — Burris Law, PLLC (57) ABSTRACT

A light device includes a first light emitting unit which includes a first lens module and a first light emitting module. The first lens module has a plurality of first lens bodies arranged to form a predetermined shape. The first light emitting module has a plurality of first light sources respectively disposed rearwardly of the first lens bodies. Each first lens bodies has a first light condensing section and a first lens section having a plurality of first lens portions which are arranged along rows such that the light projects forwardly through the first lens portions to produce a required first beam illumination pattern with the predetermined shape.

19 Claims, 8 Drawing Sheets

LIGHT DEVICE FOR A VEHICLE

CROSS-REFERENCE TO RELATED APPLICATION

This application claims priority to Taiwanese Patent Application No. 112122444, filed on Jun. 15, 2023.

FIELD

The disclosure relates to a light device for a vehicle, and more particularly to a light device which generates different beam illumination patterns.

BACKGROUND

A conventional light device for a vehicle includes a bulb-shaped low beam light emitting unit and a bulb-shaped high beam light emitting unit which are disposed within an enclosure and spaced apart from each other. When activated to a low illumination mode or a high illumination mode, the corresponding light emitting unit projects light through a light cover, a circular light spot is presented on the light cover and projects forward to generate a low beam illumination pattern or a high beam illumination pattern. Such circular light spot is monotonous. It is desirable to present a certain pattern such as letters or geometric shapes onto the light cover and project forwards a low beam illumination pattern or a high beam illumination pattern.

SUMMARY

Therefore, an object of the disclosure is to provide a light device for a vehicle that can alleviate at least one of the drawbacks of the prior art.

According to the disclosure, the light device includes a first light emitting unit which is operable to produce a first beam illumination pattern. The first light emitting unit includes a first lens module and a first light emitting module which is disposed rearwardly of the first lens module. The first lens module has a plurality of first lens bodies which are arranged to form a predetermined shape. The first light emitting module has a plurality of first light sources which are respectively disposed rearwardly of the first lens bodies. Each of the first lens bodies has a first light condensing section for condensing light forwardly from a corresponding one of the first light sources, and a first lens section which permits the condensed light to project forwardly therethrough. The first lens section has a plurality of first lens portions which are arranged along at least one row that extends in a transverse direction such that the light projects forwardly through the first lens portions of the first lens bodies to produce the first beam illumination pattern.

With the first lens bodies arranged to form a predetermined shape and projecting the light through the first lens portions, the first light emitting unit emits the light to present the predetermined shape, and the light projecting therethrough to produce the required first beam illumination pattern.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 1:
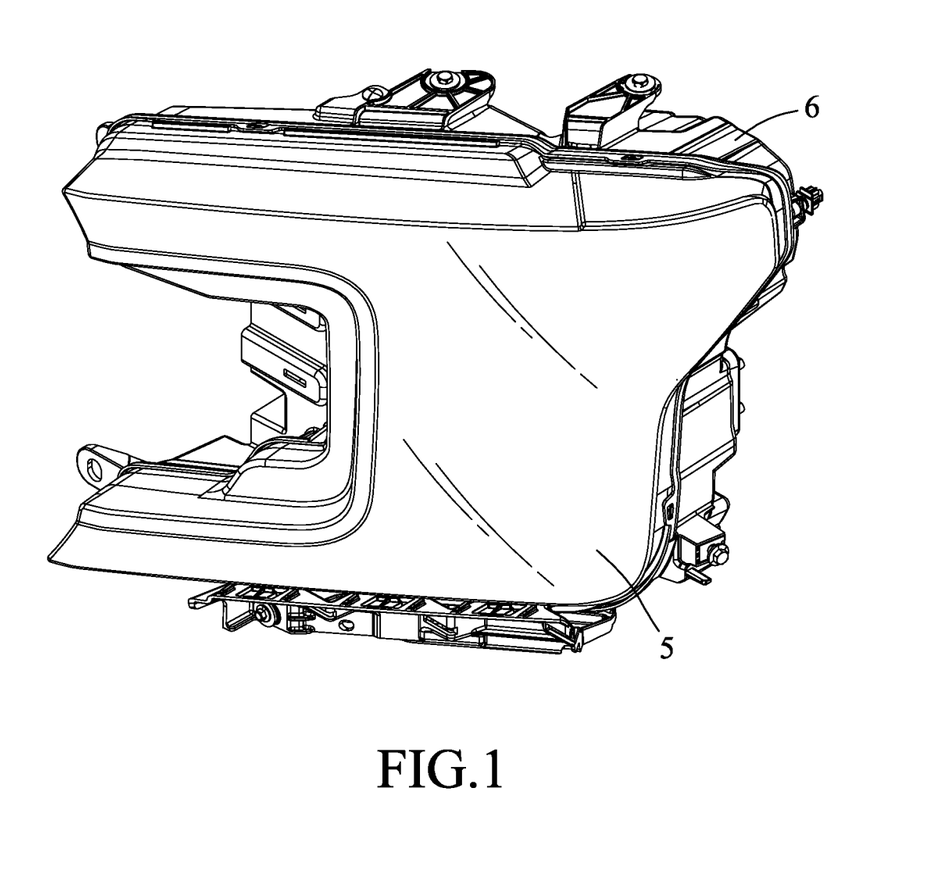
FIG. 1 is a perspective view illustrating an embodiment of a light device according to the disclosure.
Figure 2:
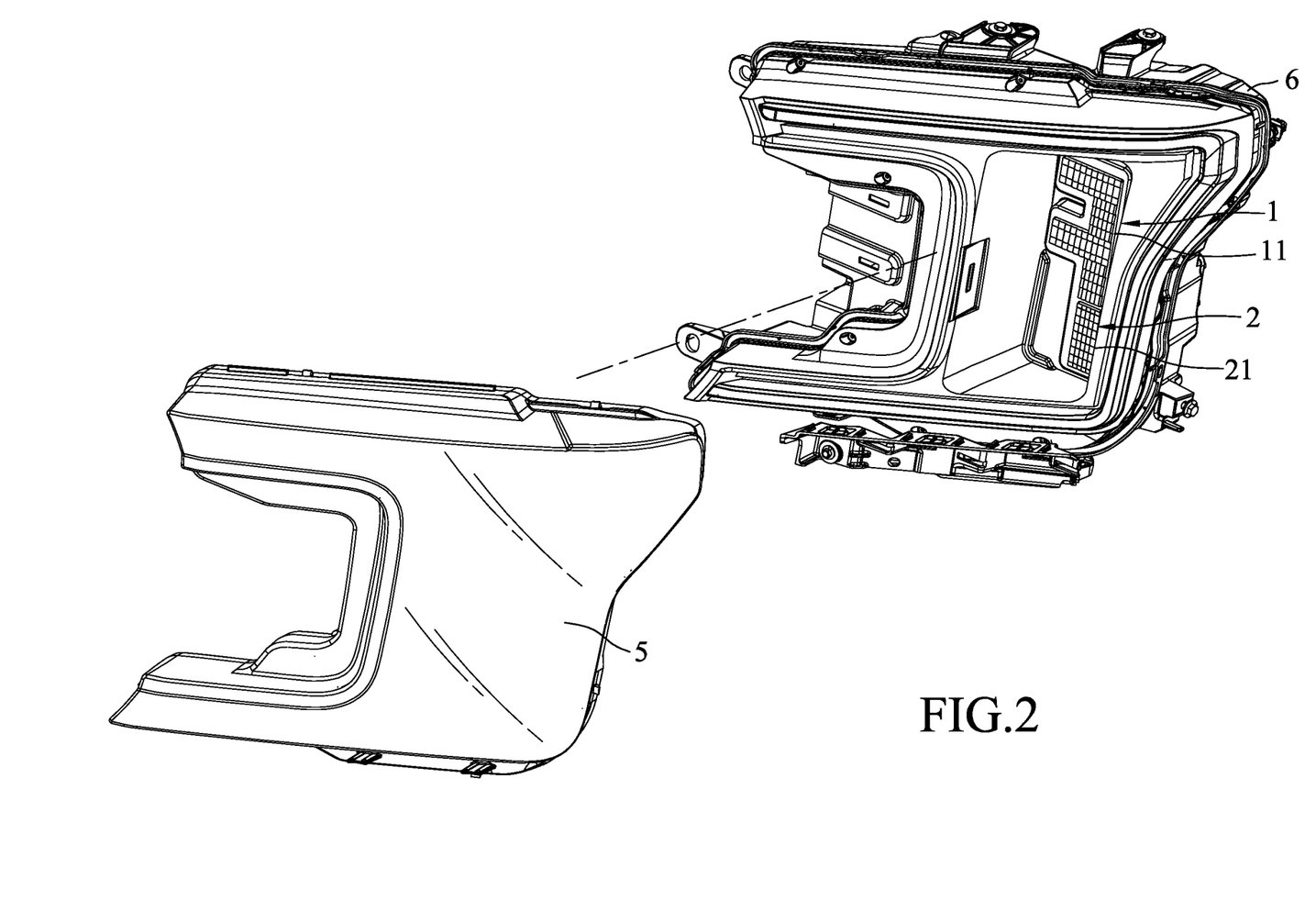
FIG. 2 is an exploded perspective view of the embodiment.
Figure 3:
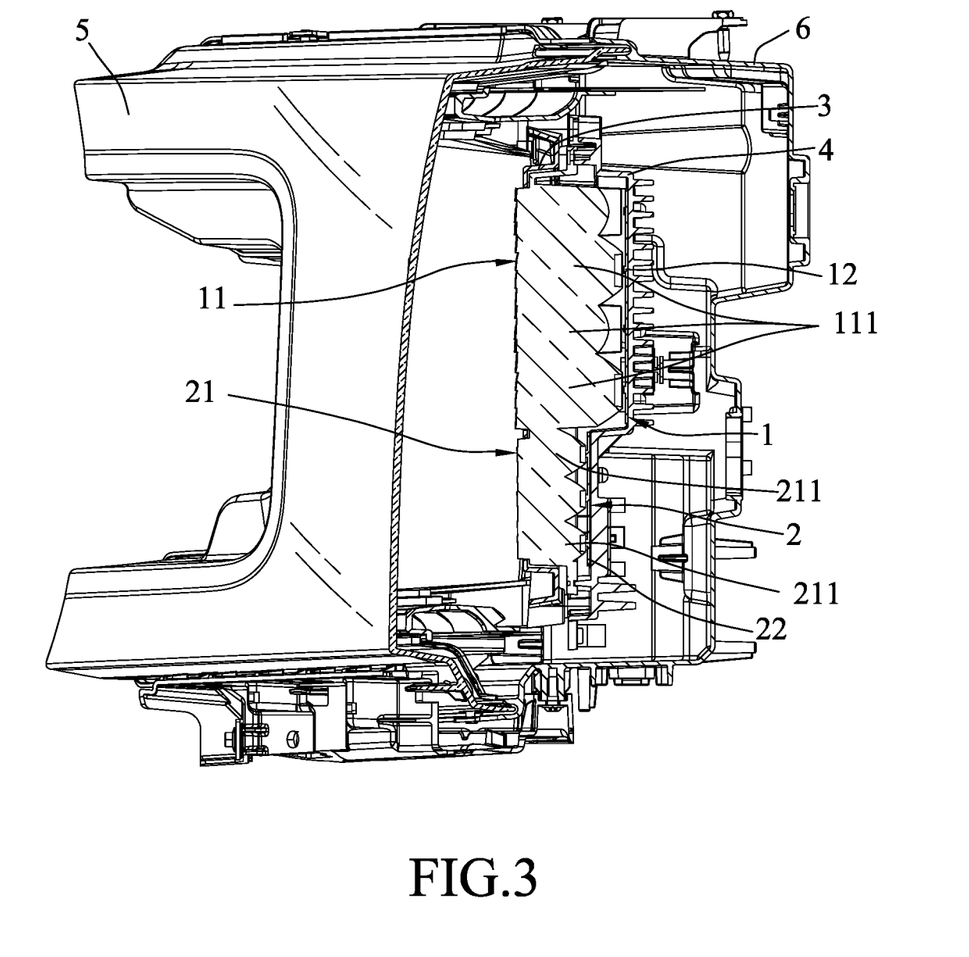
FIG. 3 is a right sectional view of the embodiment.

Referring to FIGS. 1, 2 and 3, an embodiment of a light device for a vehicle according to the disclosure is adapted to be a headlight controlled to generate at least two illumination patterns, such as but not limited to a low beam illumination pattern and a high beam illumination pattern. The light device includes a first light emitting unit 1, a second light emitting unit 2 which is disposed below the first light emitting unit 1, a mounting frame 3 and a heat sink unit 4 on which the first light emitting unit 1 and the second light emitting unit 2 are mounted and positioned in a gripping manner in an up-down direction, and an enclosure which includes a light cover 5 and a housing 6 that are coupled with each other in a front-rear direction to define a housing space therein for accommodating the first light emitting unit 1, the second light emitting unit 2 and the heat sink unit 4. That is, the first and second light emitting units 1, 2 are mounted and positioned in the housing space through the mounting frame 3 and the heat sink unit 4. Since the structure of the light cover 5 and the housing 6 is of a known type, a detailed description thereof is dispensed with.

Figure 4:
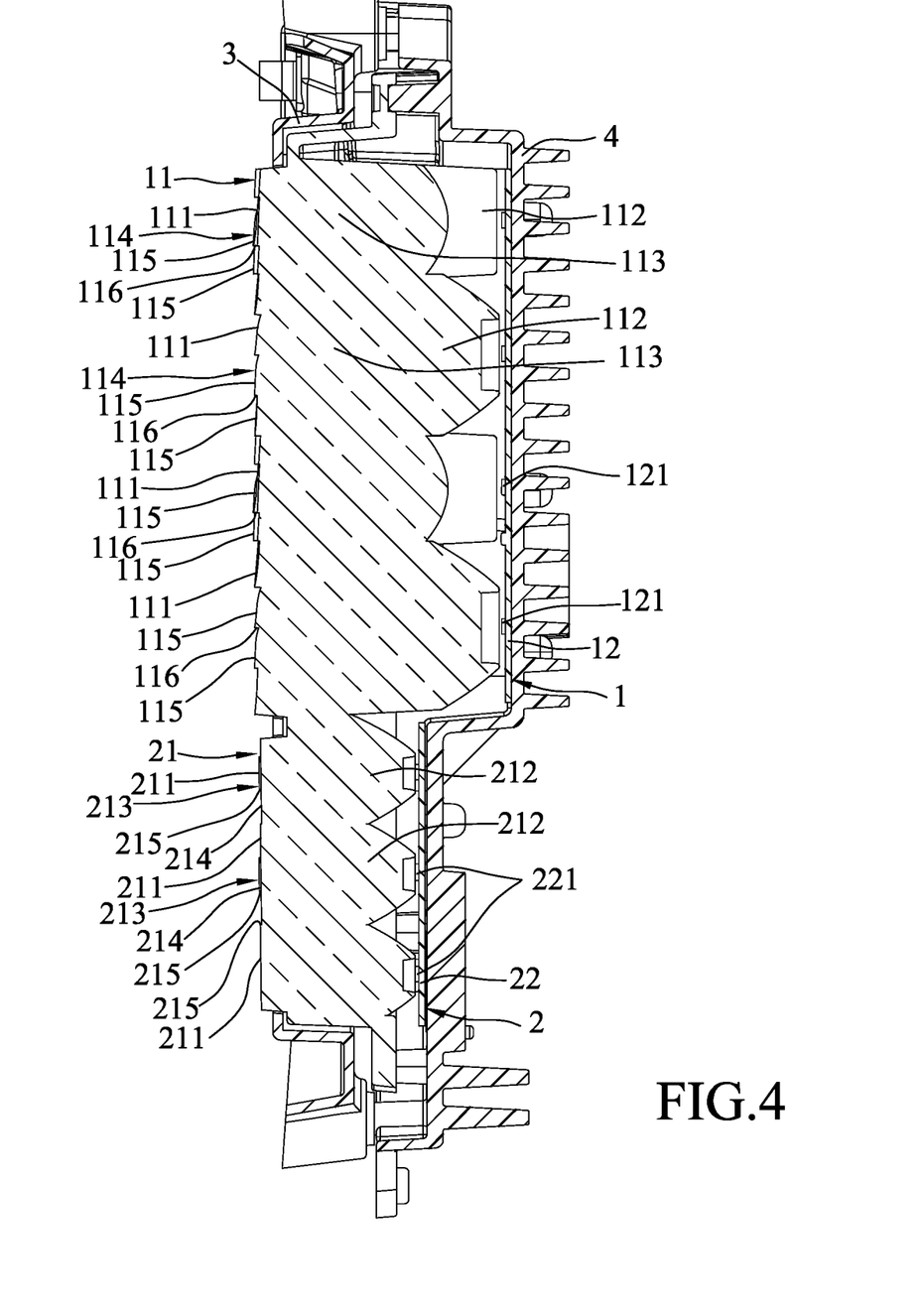
FIG. 4 is a right sectional view of the embodiment, a light cover and a housing being removed for the sake of clarity.
Figure 5:
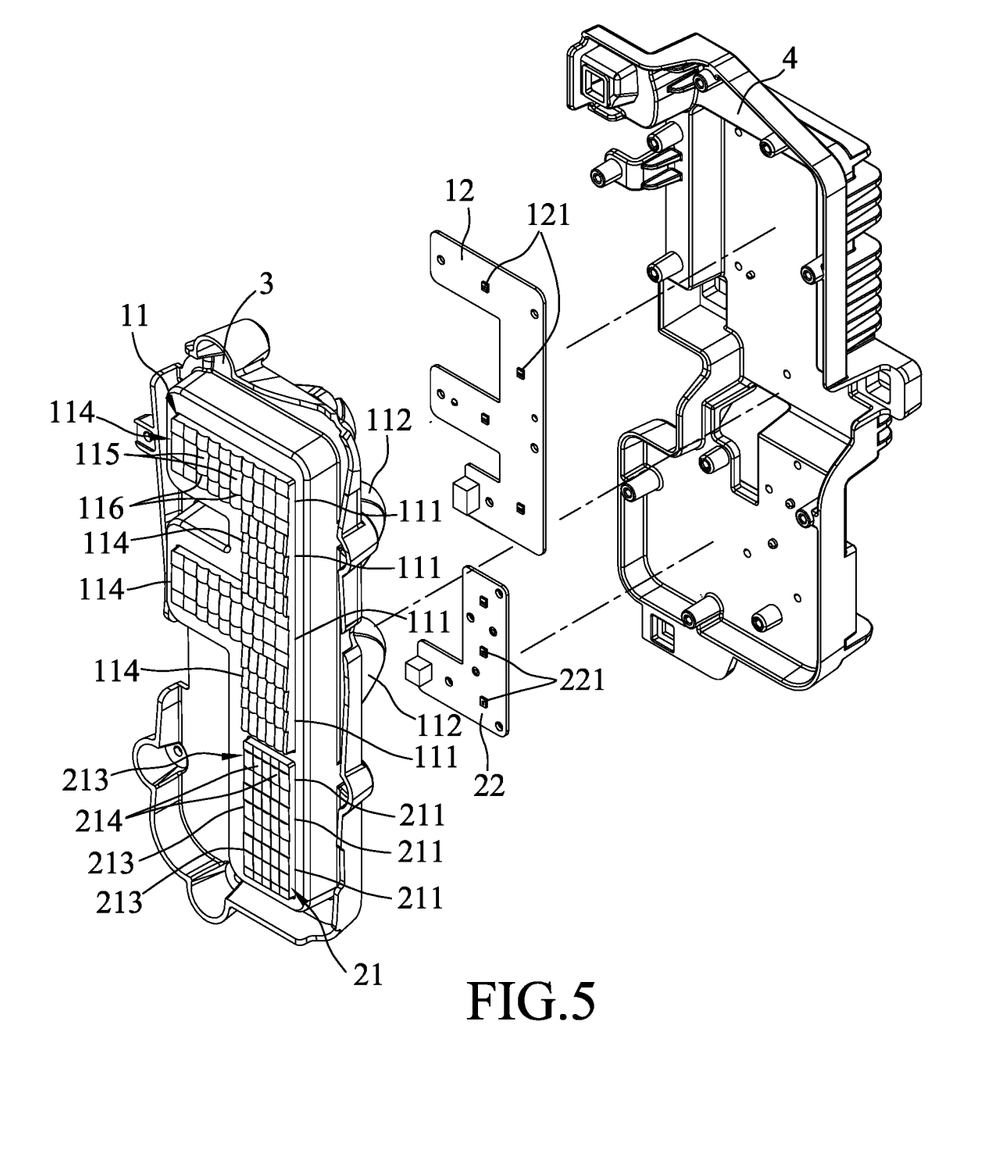
FIG. 5 is an exploded perspective view illustrating a first light emitting unit, a second light emitting unit, a mounting frame and a heat sink unit of the embodiment.
Figure 6:
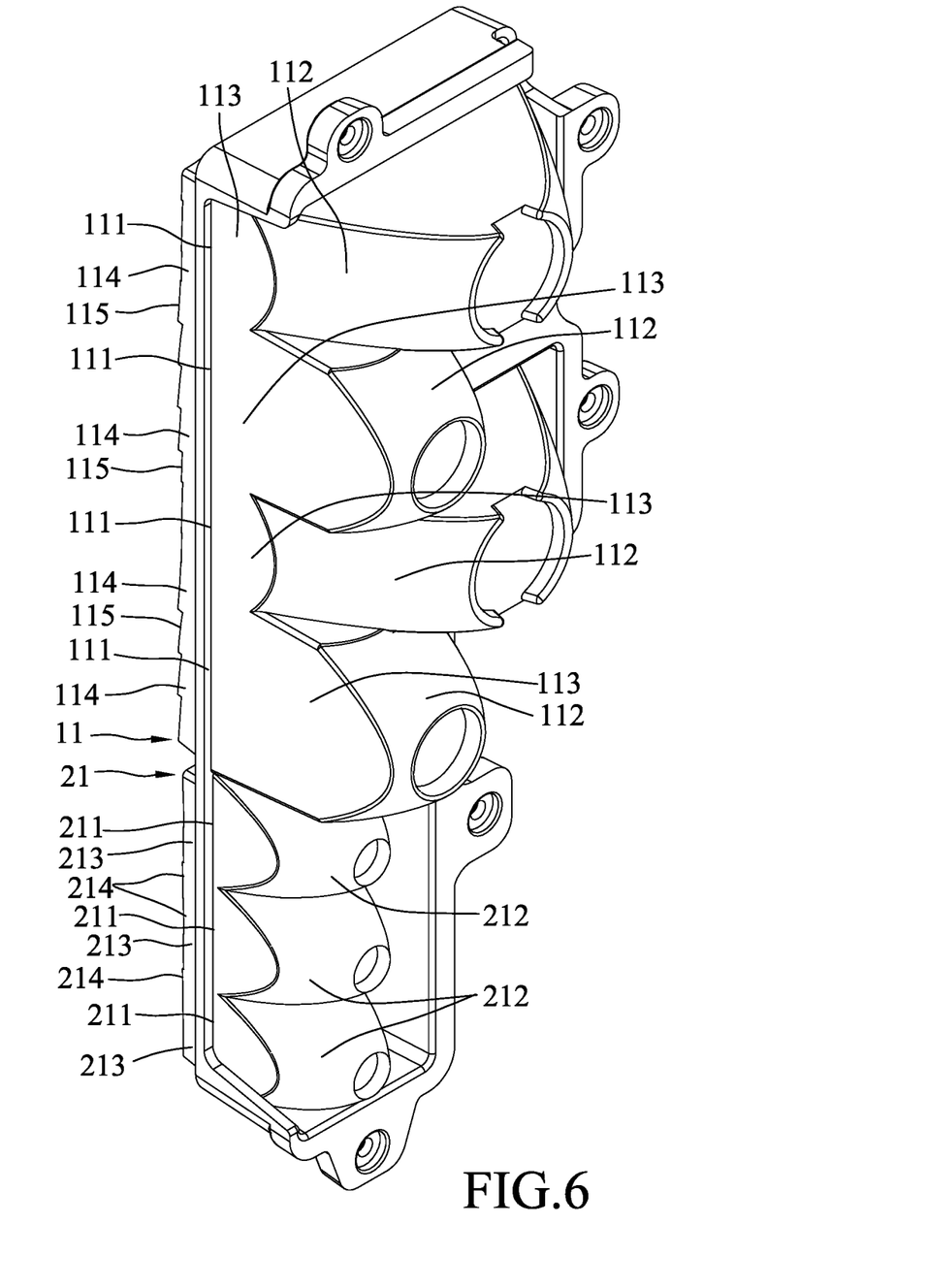
FIG. 6 is a perspective view illustrating a first lens module and a second lens module of the embodiment.
Figure 7:
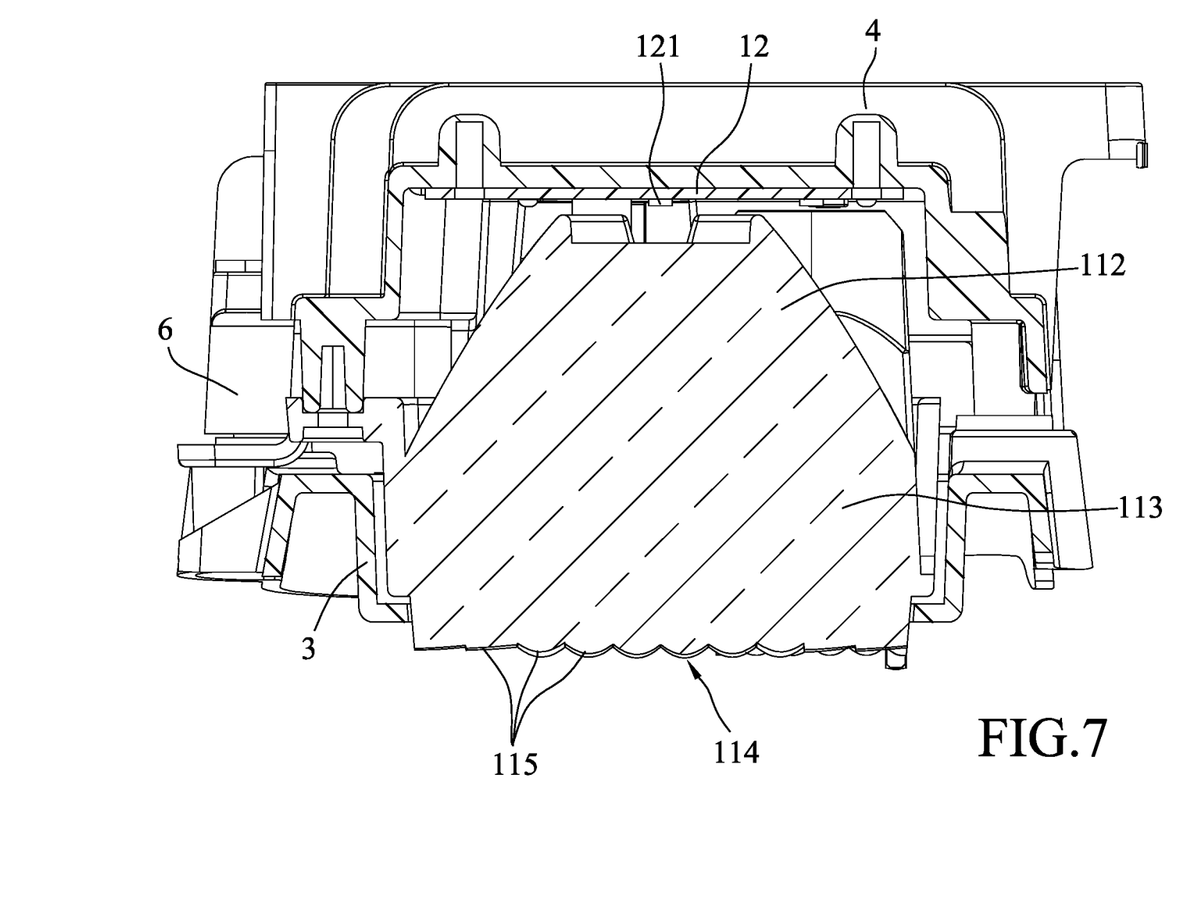
FIG. 7 is a partly sectioned top view illustrating the first light emitting unit.
Figure 8:
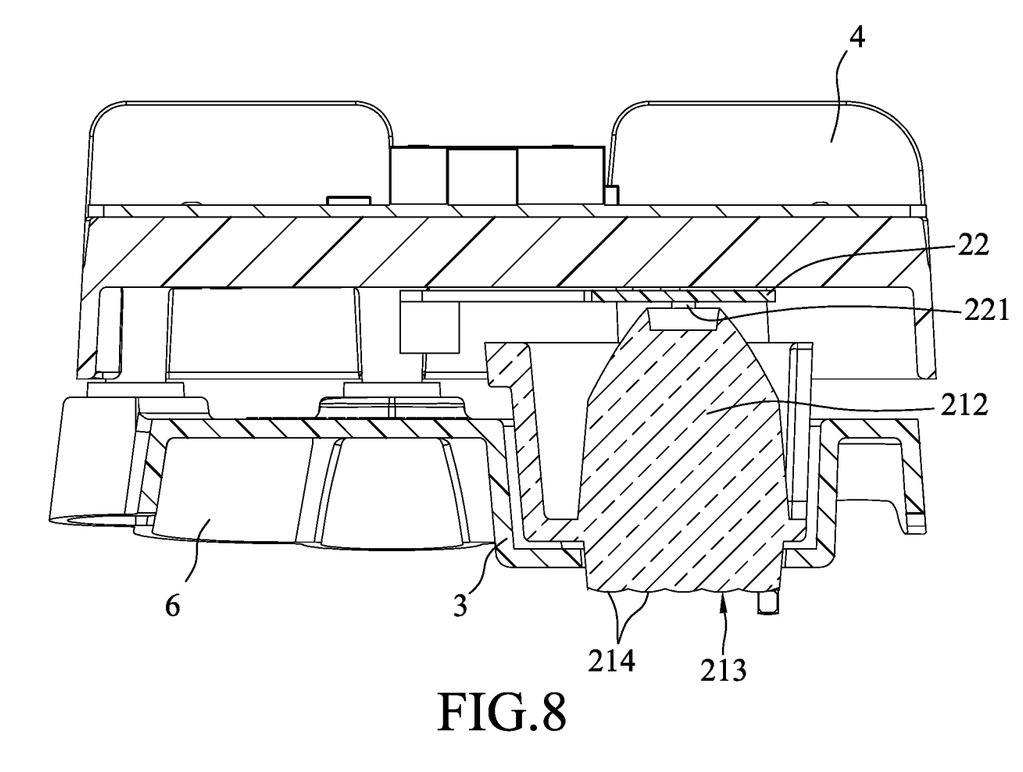
FIG. 8 is a partly sectioned top view illustrating the second light emitting unit.

With reference to FIGS. 4, 5 and 6, a first light emitting unit 1 is operable to produce a first beam illumination pattern. The first light emitting unit 1 includes a first lens module 11 which is mounted on the mounting frame 3, and a first light emitting module 12 which is connected with the heat sink unit 4 and disposed rearwardly of the first lens module 11. In this embodiment, the first lens module 11 has four first lens bodies 111 which are arranged and integrally formed with one another to form a predetermined shape, such as a letter "F". The first light emitting module 12 has four first light sources 121 which are respectively disposed rearwardly of the first lens bodies 111.

Each first lens body 111 has a first light condensing section 112 for condensing light forwardly from the corresponding first light source 121, a light transferring section 113 which is disposed forwardly of the first light condensing section 112 for guiding the condensed light forwardly, and a first lens section 114 which protrudes forwardly of the mounting frame 3 and permits the light from the light transferring section 113 to project forwardly therethrough.

The light transferring section 113 of each first lens body 111 is integrally formed with the light transferring section 113 of the adjacent first lens body 111.

The first lens section 114 of each first lens body 111 has a plurality of first lens portions 115 which are arranged along a plurality of rows that extend in a transverse direction (such as a left-right direction) and that array in an up-down direction. The first lens portions 115 are convex forward with different amplitudes, and a curvature of each first lens portion 115 measured in the left-right direction is different from that measured in the up-down direction. The first lens portions 115 of an upper row have lower ends which protrude more forward than upper ends of the first lens portions 115 of a lower row such that a step face 116 is formed between the lower ends of the first lens portions 115 of the upper row and the upper ends of the first lens portions 115 of the lower row. The light projecting forwardly through the first lens portions 115 of the first lens bodies 111 produces the first beam illumination pattern. In this embodiment, the first beam illumination pattern is a low beam illumination pattern.

In this embodiment, the light transferring section 113 of each first lens body 111 is integrally formed with the light transferring section 113 of the adjacent first lens body 111. Thus, the light entering the light transferring section 113 projects forwardly and scatters laterally to the light transferring section 113 of the adjacent first lens body 111 and to project forwardly from the adjacent first lens section 114. Alternatively, in other embodiments, the light transferring sections 113 of the adjacent first lens bodies 111 may be non-communicated with each other such that the light projects forwardly from the first lens portions 115 of the first lens bodies 111 to form the predetermined first beam illumination pattern. Moreover, in other embodiments, the light transferring section 113 may be omitted and each first lens body 111 only has the first light condensing section 112 and the first lens section 114.

With reference to FIGS. 4, 5 and 6, the second light emitting unit 2 is disposed adjacent to and downwardly of the first light emitting unit 1 and cooperates with the first light emitting unit 1 to operably produce a second beam illumination pattern. The second light emitting unit 2 includes a second lens module 21 which is mounted on the mounting frame 3 and cooperates with the first lens module 11 to form another predetermined shape, and a second light emitting module 22 which is connected with the heat sink unit 4 and disposed rearwardly of the second lens module 21. In this embodiment, the second beam illumination pattern is a high beam illumination pattern.

The second lens module 21 has three second lens bodies 211 which are arranged and integrally formed with one another to cooperate with the first lens bodies 111 to form the predetermined shape, such as a larger letter "F". The second light emitting module 22 has three second light sources 221 which are respectively disposed rearwardly of the second lens bodies 211. Each second lens body 211 has a second light condensing section 212 for condensing light forwardly from the corresponding second light source 221, and a second lens section 213 which protrudes forwardly of the mounting frame 3 and which permits the condensed light to project forwardly therethrough. The second light condensing section 212 of each second lens body 211 is integrally formed with the second light condensing section 212 of an adjacent second lens body 211. The light transferring section 113 of each first lens body 111 is integrally formed with the second light condensing section 212 of an adjacent second lens body 211.

The second lens section 213 of each second lens body 211 has a plurality of second lens portions 214 which are arranged along a plurality of rows that extend in the transverse direction (such as the left-right direction) and that array in the up-down direction. The second lens portions 214 are convex forward with different amplitudes, and a curvature of each second lens portion 214 measured in the left-right direction is different from that measured in the up-down direction. The second lens portions 214 of an upper row have lower ends which protrude more forward than upper ends of the second lens portions 214 of a lower row such that a step face 215 is formed between the lower ends of the second lens portions 214 of the upper row and the upper ends of the second lens portions 214 of the lower row.

Cooperating with the light projecting forwardly through the first lens portions 115 of the first lens bodies 111, the light projecting forwardly through the second lens portions 214 of the second lens bodies 211 produces the second beam illumination pattern.

In this embodiment, the second light condensing sections 212 of the adjacent second lens bodies 211 are integrally formed with each other. Thus, the light condensed forwardly from the second light condensing section 212 projects forwardly and scatters laterally to the adjacent second light condensing section 212 and to project forwardly from the adjacent second lens section 213.

The light transferring section 113 of the first lens body 111 is integrally formed with the second light condensing section 212 of the adjacent second lens body 211. Thus, the light from the light transferring section 113 of the first lens body 111 projects forwardly through the corresponding first lens section 114 in the front side, and scatters laterally to the second light condensing section 212 of the adjacent second lens body 211 and projects forwardly through the adjacent second lens section 213.

Alternatively, in other embodiments, the second light condensing sections 212 of the adjacent second lens bodies 211 may be non-communicated with each other, and the light transferring section 113 of the first lens body 111 and the second light condensing section 212 of the adjacent second lens body 211 may be non-communicated with each other such that the light projecting forwardly from the second lens portions 214 of the second lens bodies 211 cooperates with the light projecting forwardly from the first lens portions 115 of the first lens bodies 111 to form the predetermined second beam illumination pattern.

In this embodiment, the first beam illumination pattern is a low beam illumination pattern, and the second beam illumination pattern is a high beam illumination pattern. The number of the first lens bodies 111 of the first light emitting unit 1 is four, and the first lens bodies 111 are arranged to form a letter "F". The number of the second lens bodies 211 of the second light emitting unit 2 is three, and the second lens bodies 211 and the first lens bodies 111 are arranged to form a large letter "F". In other embodiments, the first and second beam illumination patterns may be exchanged, and the numbers of the first and second lens bodies 111, 211 may be varied, which depends on the predetermined shape the first and second lens bodies 111, 211 to arrange to form therefrom.

Moreover, the predetermined shape that the first lens bodies 111 and the second lens bodies 211 form is not limited to be a letter "F", and may be any one of lowercase or capital letters, Korean alphabet, Japanese syllabary, numbers or geometric shapes. For example, it may be a letter "0", number "7" or a star-shape.

Furthermore, in other embodiments, other than a shape of letter "F", the first lens bodies 111 may be arranged to form a predetermined shape, such as a letter "O", and the second lens bodies 211 and the first lens bodies 211 are cooperatively arranged to form a letter "Q".

With reference to FIGS. 4, 5, 7 and 8, in this embodiment, the first lens portions 115 of one part have the same curvature, and the first lens portions 115 of the other part have different curvatures. The second lens portions 214 of one part have the same curvature, and the second lens portions 214 of the other part have different curvatures. In other embodiments, each of the first lens portions 115 may have the same curvature, or have a curvature different from that of any other one of the first lens portions 115. Each of the second lens portions 214 may have the same curvature, or have a curvature different from that of any other one of the second lens portions 214. Similarly, the first lens portions 115 are arranged such that the light projecting forwardly through the first lens portions 115 produces a predetermined first beam illumination pattern, and the second lens portions 214 are arranged such that, cooperating with the light projecting forwardly through the first lens portions 115, the light projecting forwardly through the second lens portions 214 produces a predetermined second beam illumination pattern.

As illustrated, with the first lens bodies 111 arranged to form a predetermined shape and projecting the light through the first lens portions 115, the first light emitting unit 1 emits the light to present the predetermined shape, and the light projecting forwardly therethrough produces the required first beam illumination pattern. Also, with the second lens bodies 211 cooperatively arranged with the first lens bodies 111 to form another predetermined shape and projecting the light through the second lens portions 214, the second light emitting unit 2 and the first light emitting unit 1 emit the light to present the predetermined another shape, and the light projecting forwardly therethrough cooperates with the light projecting forwardly through the first lens portions 115 and produces the required second beam illumination pattern.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A light device for a vehicle comprising:
a first light emitting unit which is operable to produce a low beam illumination pattern, said first light emitting unit including a first lens module and a first light emitting module which is disposed rearwardly of said first lens module, said first lens module having a plurality of first lens bodies which are arranged to form a predetermined shape, said first light emitting module having a plurality of first light sources which are respectively disposed rearwardly of said first lens bodies, each of said first lens bodies having a first light condensing section for condensing light forwardly from a corresponding one of said first light sources, and a first lens section which permits the condensed light to project forwardly therethrough, said first lens section having a plurality of first lens portions which are arranged along at least one row that extends in a transverse direction such that the light projects forwardly through said first lens portions of said first lens bodies to produce said low beam illumination pattern; and
a second light emitting unit disposed adjacent to said first light emitting unit and cooperating with said first light emitting unit to operably produce a high beam illumination pattern, said second light emitting unit including a second lens module which cooperates with said first lens module to form another predetermined shape, and a second light emitting module which is disposed rearwardly of said second lens module, said second lens module having a plurality of second lens bodies which are arranged to cooperate with said first lens bodies to form said another predetermined shape, said second light emitting module having a plurality of second light sources which are respectively disposed rearwardly of said second lens bodies, each of said second lens bodies having a second light condensing section for condensing light forwardly from a corresponding one of said second light sources, and a second lens section which permits the condensed light to project forwardly therethrough, said second lens section having a plurality of second lens portions which are arranged along a row that extends in the transverse direction such that, cooperating with the light projecting forwardly through said first lens portions of said first lens bodies, the light projects forwardly through said second lens portions of said second lens bodies to produce said high beam illumination pattern.

2. The light device of claim 1, wherein each of said first lens bodies further has a light transferring section which is formed between said first light condensing section and said first lens section for guiding the condensed light forwardly to said first lens section.

3. The light device of claim 1, wherein said first lens section of each of said first lens bodies has a plurality of rows of said first lens portions which are arranged in an up-down direction, said first lens portions of an upper row having lower ends which project more forward than upper ends of said first lens portions of a lower row such that a step face is formed between said lower ends of said upper row of said first lens portions and said upper ends of said lower row of said first lens portions.

4. The light device of claim 2, wherein said light transferring section of each of said first lens bodies is integrally formed with said light transferring section of an adjacent one of said first lens bodies.

5. The light device of claim 1, wherein each of said first lens portions has the same curvature.

6. The light device of claim 5, wherein each of said second lens portions has the same curvature.

7. The light device of claim 5, wherein each of said second lens portions has a curvature different from that of any other one of said second lens portions.

8. The light device of claim 5, wherein said second lens portions of one part have the same curvature, and said second lens portions of the other part have different curvatures.

9. The light device of claim 1, wherein each of said first lens portions has a curvature different from that of any other one of said first lens portions.

10. The light device of claim 9, wherein each of said second lens portions has the same curvature.

11. The light device of claim 9, wherein each of said second lens portions has a curvature different from that of any other one of said second lens portions.

12. The light device of claim 9, wherein said second lens portions of one part have the same curvature, and said second lens portions of the other part have different curvatures.

13. The light device of claim 1, wherein said first lens portions of one part have the same curvature, and said first lens portions of the other part have different curvatures.

14. The light device of claim 13, wherein each of said second lens portions has the same curvature.

15. The light device of claim 13, wherein each of said second lens portions has a curvature different from that of any other one of said second lens portions.

16. The light device of claim 13, wherein said second lens portions of one part have the same curvature, and said second lens portions of the other part have different curvatures.

17. The light device of claim 1, wherein said second light condensing section of each of said second lens bodies is integrally formed with said second light condensing section of an adjacent one of said second lens bodies.

18. The light device of claim 1, wherein said light transferring section of each of said first lens bodies is integrally formed with said second light condensing section of an adjacent one of said second lens bodies.

19. The light device of claim 1, further comprising a heat sink unit which is connected with said first light emitting module and said second light emitting module, and a light cover and a housing which cooperatively define a housing space therein for accommodating said first light emitting unit, said second light emitting unit and said heat sink unit.

\* \* \* \* \*